United States Patent [19]

McMains et al.

[11] Patent Number: 4,527,832
[45] Date of Patent: Jul. 9, 1985

[54] SEATING APPARATUS WITH REMOVABLE RECLINABLE BACK ASSEMBLIES

[75] Inventors: Kevin W. McMains, Grand Rapids; Larry A. Wilkerson, Comstock Park, both of Mich.

[73] Assignee: American Seating Company, Grand Rapids, Mich.

[21] Appl. No.: 476,421

[22] Filed: Mar. 17, 1983

[51] Int. Cl.³ .................. A47C 1/024; A47C 7/42
[52] U.S. Cl. ............................ 297/355; 297/443; 297/451
[58] Field of Search ............ 297/355, 443, 444, 232, 297/450, 451, 455, 378, 379, 311, 313, 354; 49/388

[56] References Cited

U.S. PATENT DOCUMENTS

| Re. 27,336 | 4/1972 | Bereday | 297/455 |
|---|---|---|---|
| 2,703,603 | 3/1955 | Endicott | 297/450 |
| 3,630,572 | 12/1971 | Homier | 297/DIG. 2 |
| 3,662,493 | 5/1972 | Foltz | 49/388 |
| 3,727,266 | 4/1973 | Ashworth | 49/388 |
| 3,885,766 | 5/1975 | Resch et al. | 297/232 |
| 3,895,838 | 7/1975 | Hamada | 49/388 |
| 3,988,034 | 10/1976 | Fister, Jr. | 297/455 |
| 4,070,728 | 1/1978 | Herman | 49/388 |
| 4,159,847 | 7/1979 | Arai | 297/355 |

*Primary Examiner*—Victor N. Sakran
*Assistant Examiner*—Mark W. Binder
*Attorney, Agent, or Firm*—Emrich & Dithmar

[57] ABSTRACT

A seating assembly in which each of a pair of reclinable back assemblies is attached to the seat frame by way of a pair of mounting brackets, one fixed and one adjustable, the adjustable bracket being releasably locked to the frame when the back seat is in place and with the fixed bracket defining pivot points for the seat back. The recliner mechanism for the seat backs are contained within armrests for the seats, the armrests being cantilever mounted to maximize leg and hip room for occupants of the seats. A pedestal mount supports the seating assembly near the center of the unit. The back seat cushion comprises deep layered foam covered with woven upholstery fabric that is tufted to achieve a "loose pillow" appearance, the cushion construction being accomplished with the use of a grid of wires which control the pillow shape, and a series of pull tabs which create a tufted-button look.

8 Claims, 8 Drawing Figures

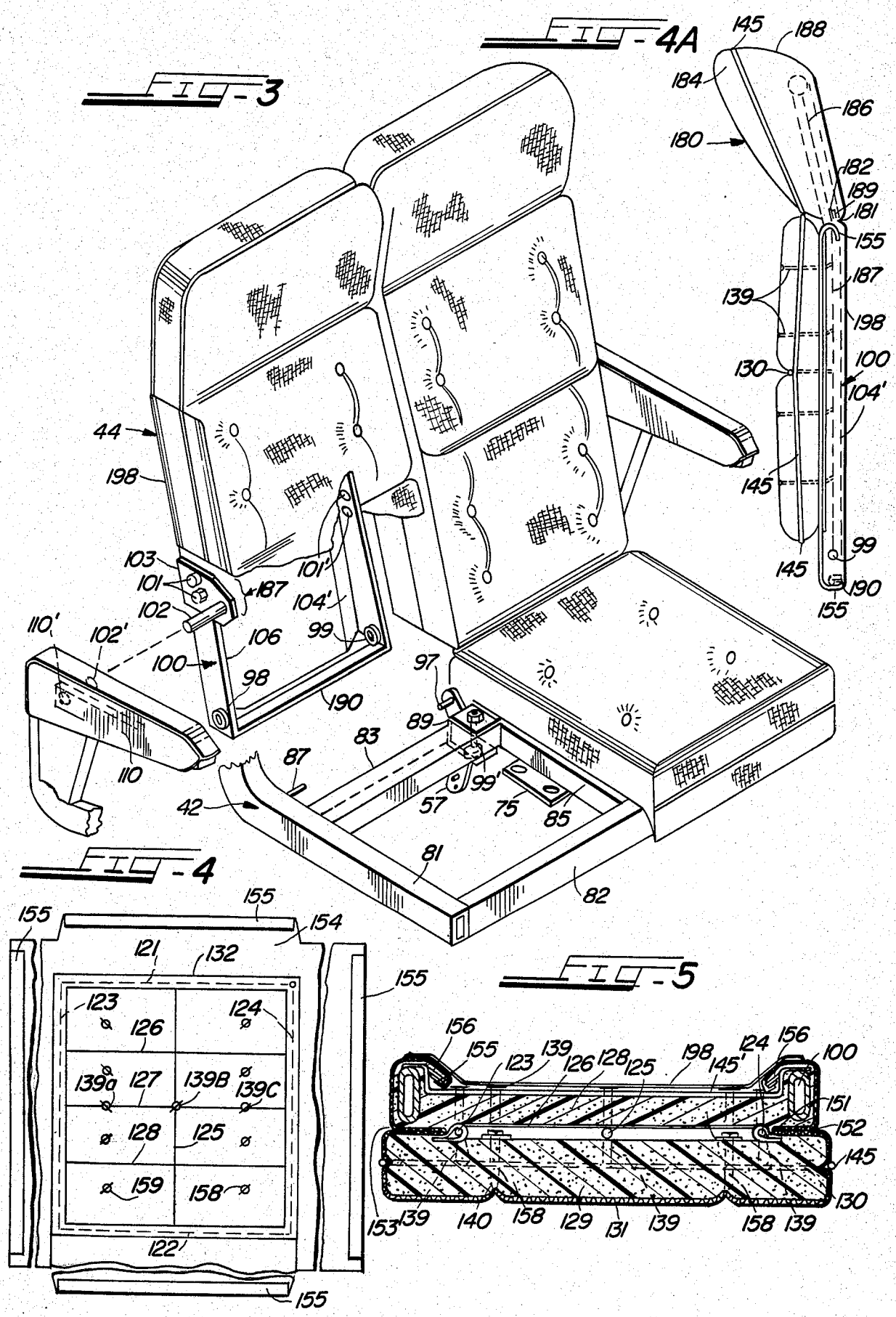

SEATING APPARATUS WITH REMOVABLE RECLINABLE BACK ASSEMBLIES

BACKGROUND OF THE INVENTION

This invention relates to seating assemblies, and more particularly to a reclinable seating assembly for use in transportation vehicles and the like.

With the increasing competition developing in the field of public transportation, it is becoming increasingly important for operators to improve coach appearance and passenger comfort while at the same time minimizing maintenance costs.

The present invention provides a reclinable seating assembly which is easier to maintain than comparable seating units presently in use and which provides improved coach appearance and passenger comfort.

In accordance with the invention, back assemblies of the seating unit are attached to the seat frame assembly by way of a novel mounting arrangement in which each back is attached to the frame by way of a pair of mounting brackets, one fixed and one adjustable. The seat backs are easily removable because it is merely necessary to disconnect the reclining mechanism form the seat back and to remove one screw from the adjustable bracket to release the seat back.

The seating assembly employs interchangeable parts, and right and left hand parts have been eliminated wherever possible. For example, seat backs are completely interchangeable. Similarly, seat cushions and armrests, are completely interchangeable. This not only results in fewer parts to stock for replacement, but also allows parts to be rotated within any one coach for even wear and extended seat life.

The seating assembly features a "T" pedestal mounting for supporting the seating assembly. This system leaves the floor area clear for easy cleaning and general floor maintenance.

In accordance with another feature of the invention, the seat features deep layered foam covered with plush woven upholstery fabric that is tufted to achieve a "loose pillow" appearance. The cushion construction is accomplished with the use of a series of wires which control the pillow shape, and a series of pull tabs which create a tufted-button look.

In accordance with a further feature of the invention, the seating unit includes a cantilevered armrest design which allows more leg and hip room. The cantilevered arm also houses the recline mechanism and incorporates a more easily reached recline actuator button in the end of the arm. The recline mechanism allows an 8-inch recline range with infinite recline stops.

The provision for removable seat backs and for a pedestal support assembly adapted to be removably fastened to the bottom of the basic frame results in a modular construction which is particularly advantageous in that it provides reduced shipping volume. This permits the seating assemblies to be shipped in higher density and affords more compact storage in warehouses.

Other features and advantages of the invention will become apparent upon reading the following detailed description which refers to the drawings.

DESCRIPTION OF THE DRAWINGS

FIG. 3 is a partially exploded view of the seating assembly shown in FIG 1;

FIG. 4 is a view of the rear side of a back seat pillow for the seating assembly, shown with the back cover fabric removed;

FIG. 4A is a side view of the pillow shown in FIG. 4;

FIG. 5 is a sectional view of the back seat; and

DETAILED DESCRIPTION

Figure 1:
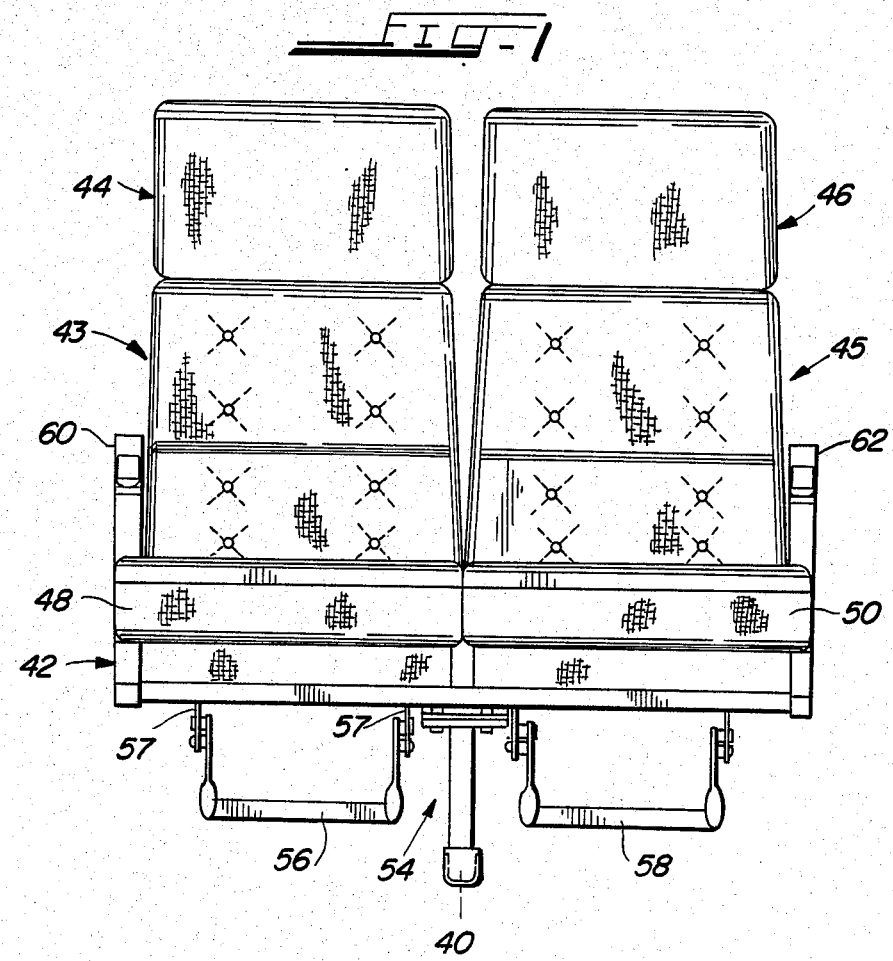
FIG. 1 is a front elevational view of a seating assembly provided by the present invention.

Referring to FIG. 1 of the drawings, the numeral 40 designates generally a seating assembly constructed according to the teachings of the instant invention. The seating assembly includes two chairs so as to accommodate two occupants and is useful particularly for passenger transports such as buses, trains or airplanes. The chairs are designated by numerals 45 and 43 in the drawings and appear as the left hand and right hand chairs, respectively, as viewed in FIG. 1.

The seating assembly 40 comprises a frame 42 which supports a pair of reclinable back seat assemblies 44 and 46, and a pair of seat cushions 48 and 50. A "T" pedestal 54 secures the seat assembly to the floor of the vehicle in which it is used. Each chair is equipped at the rear with a footrest as at 56 relative to the back 44 and 58 relative to the back 46. The footrests are suspended from hanger brackets 57, which are attached to the underside of the frame 42. As showm best in FIG. 2, footrest 56 is illustrated in a "use" position, but is pivotable about pivot 59 to a stowed position. The ends of the footrests are rounded, defining a teardrop configuration, to prevent injury to passengers or tripping hazard.

Figure 2:
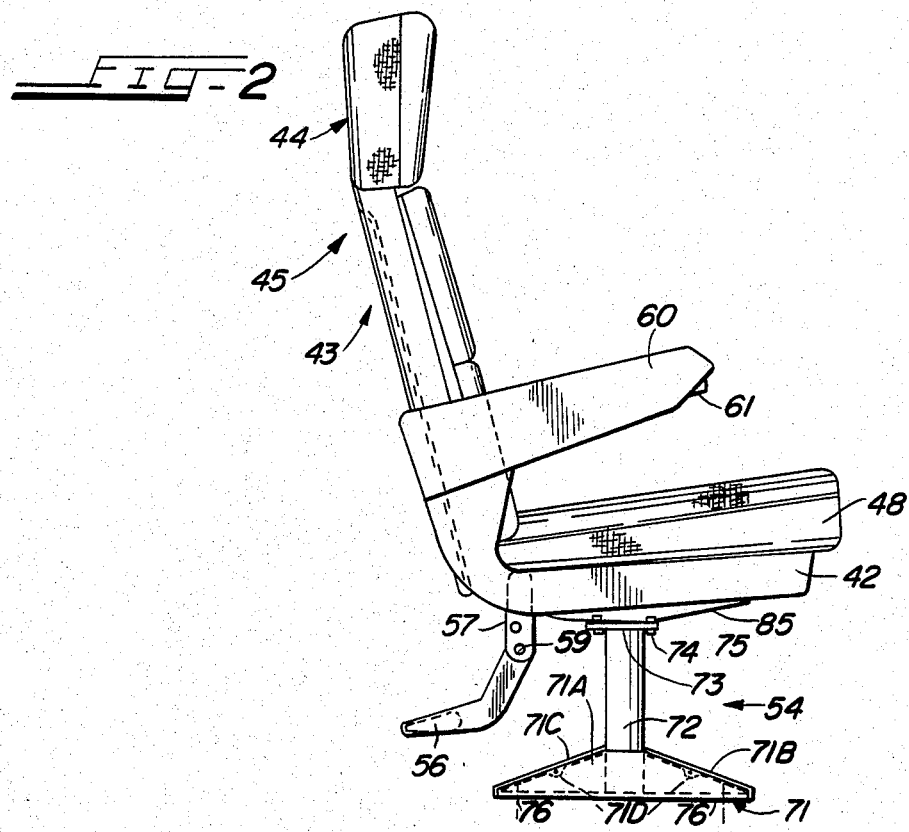
FIG. 2 is a side view of the seating assembly shown in FIG. 1.

With continued reference to FIGS. 1 and 2, each of the seats 43 and 45 includes an armrest, such as armrest 60 for seat 43 and armrest 62 for seat 45. As shown best in FIG. 2, armrest 60 is cantilevered mounted on the frame 42 at the right side of the seating unit. Similarly, armrest 62 is cantilevered mounted on the frame at the left side of the seating assembly. The cantilevered mounting of the two armrests allows more leg and hip room for occupants of the seating assembly.

The seating assembly essentially is thus comprised of the basic frame and seat cushion assembly, the left and right back assemblies, and the support or pedestal mount assembly. Wherever possible, right and left hand parts have been eliminated in favor of a common part. For example, seat backs, cushions and arm mechanisms are completely interchangeable for the left and right chairs.

The armrest for each chair houses a recliner mechanism (not shown) which allows the back of its associated seat to be reclined over an 8-inch recline range with infinite recline stops. By way of example, the recline mechanism may comprise a Porter mechanism, an infinite adjust recline mechanism commonly used in the art of transportation seating. The recline mechanism actuator 61 for the right hand seat is located in the end of the arm 60.

Referring to FIG. 2, the support pedestal 54 includes a generally trapezoidal shaped foot member 71, a support post 72 and a mounting plate 73. The mounting and support member are welded to opposite ends of the support post. The pedestal is attached to the frame 42 of the seating assembly by the mounting plate 73, which is fastened by way of suitable fasteners 74 to an attachment plate 75 welded to the bottom surface of the frame. The pedestal foot member 71 is a channel shaped member 71a and is provided with a pair of removable covers 71b, 71c, which mount on the channel member and are attached thereto by screws 71d. Mounting holes 76 located in the bottom of the channel member facilitate mounting of the seating unit to the floor of the vehicle in a suitable manner.

Referring now to FIG. 3, the back assemblies 44 and 46 are attached to the seat frame assembly by way of a novel mounting arrangement provided by the invention. As will be described, each back is attached to the frame by way of a pair of mounting brackets, one fixed and one movable. Assembly of each back onto the frame can be done in minutes because, as will be shown, the assembly involves removal of one bolt form the adjustable bracket, and disconnecting a shaft of the recliner mechanism from the back.

The frame 42 is seen to include a right side tube 81 and a left side tube (not shown), extending generally parallel to one another, defining the sides of the frame. A rear stretcher tube 83 and a front stretcher tube 82 extend parallel to one another and perpendicular to the side tubes, defining the back and front edges of the seat frame assembly. A center stretcher tube 85 extends between and perpendicular to rear stretcher tube 83 and the front stretcher tube. The main frame supports are welded to provide a generally rectangular framework of a rigid construction. The footrest hangers 57 are attached to the underside of rear stretcher 83. The pedestal attachment plate 75 is welded to the bottom of the frame adjacent to the center stretcher 85. The frame assembly 42 is provided with a pair of brackets including a fixed bracket 87, and an adjustable bracket 89 for attaching the right seat back 44 to the frame assembly 42. A like pair of brackets (not shown) are provided for attaching the left seat back to the frame.

The fixed bracket 87 is welded to the back right edge of the side channel member 81 and comprises a pivot pin, which is received in a bushing 98 in the right rail 106 of the back seat frame 100. The adjustable bracket 89 is a generally U-shaped bracket, which slides over the channel-shaped rear stretcher member 83. A pivot pin 97, which is welded to the bracket 89, is received in a mating bushing 99 in the left rail 104 of the frame 100 of the back assembly 44.

The right rail 106 of the seat back frame 100 has two threaded bushings 101 which facilitate connection of a plate 103, which carries a pin 102 for connecting the recliner mechanism to the seat back. As indicated above, the seat backs are identical and, accordingly, a pair of threaded bushings 101', which correspond to bushings 101, are provided in the left-hand side rail 104' of the back frame 100. The right and left side bushings allow back seat assembly to be used for right or left side mounting in a chair unit.

In assembling the back assembly 44 onto the frame, the back is positioned such that bushing 98 can be slipped over pivot pin 87. Then the adjustable bracket 89 is moved along the rear stretcher until the pivot pin 97 engages the bushing 99. When this is accomplished, mounting holes in the bracket 89 are aligned with mounting holes in the rear stretcher, and the bracket is secured by way of a dog point hex head cap screw 99'. Then the output shaft 110 of the Porter mechanism (represented by the dashed line in FIG. 3), which is contained within the armrest assembly, is connected to plate 103 of the back assembly 44 by way of pine 102, which extends through a hole 102' in the side of the armrest and a hole 110' in the shaft 110. Back seat assembly 46 is attached to the frame 42 in a similar manner by way of a pair of brackets (not shown), which are similar to brackets 87 and 89, but reversed left to right in configuration to facilitate the left hand mounted seat 46.

It is apparent that the back assemblies 44 and 46 are easily removable permitting the backs to be changed in minutes. For example, to remove the back 44, it is merely necessary to disconnect the output shaft 110 of the Porter mechanism from the pin 102. Then, the hex head bolt 99' on the bracket 89 is loosened and removed, allowing the slidable bracket to be moved to the right, disengaging the pivot shaft 97 from the bushing 99 in the seat back. The seat back 44 then can be lifted off.

Referring to FIG. 1, the upholstery for the seating unit 40 is constructed to create a pillow look with only one layer of fabric on the exposed front. The cushions comprise a deep layered foam covered with plush woven upholstery fabric that tufted to achieve a "loose pillow" appearance, and provide adequate lumbar support.

Referring to FIGS. 4 and 4A, the "pillow look" construction is accomplished by using a grid of wires which control the pillow shape. The wire grid comprises a generally rectangular frame made up of four wires 121–124, four cross members 125–128, and further wire 130 (FIG. 5). Wire 125 extends between wires 121 and 122 from the top to the bottom of the pillow and has its ends connected to wires 121 and 122. The wires 126–128 extend between wires 123 and 124 between the sides of the pillow and have their ends connected to wires 123 and 124. A plurality of pull tabs 139 draw the upholstery inward, creating depressions illustrated in FIG. 1, which give the appearance of a tufted-button look.

Referring to FIG. 5, the back seat pillow includes a relatively thin layer of foam 128, which covers inner surface of the metal back frame and wraps around the back edges of the frame, a layer of soft foam 129 and the outer covering or upholstery 131. The control wires 121–128 are located between the two foam layers. The four wires 121–124, which form the frame are contained within a sleeve 132, shown best in FIG. 4.

Referring to FIG. 5, the covers which encase the grid wires are stitched to the upholstery fabric as indicated at 151 so that the wires pull the fabric down giving a contoured look to the outer surface of the pillow as shown in FIG. 1. The cross wires 125–128 keep the frame wires 121–124 in place, such that the upholstery material is tightly drawn around the side peripheral edges of the pillow as indicated at 152 and 153. The edges 154 of the upholstery have plastic strips 155 sewn thereto, which attach the pillow to the frame. The loose edges 154 of the upholstery on the top and sides of the pillow, as shown in FIG. 4, are wrapped around the frame as shown in FIG. 5, and secured to the back side of the frame by hooking the strips 155 over tabs 156 formed in this back lower pan 187. The plastic strip on the loose edge at the bottom of the pillow is received in a channel 190 located in the bottom rail of the back frame. The back seat assembly further includes a headrest assembly 180. The headrest assembly includes a layer of foam 184, which encapsulates the upper pan 186 of the back frame 100. A removable cover 188 is adapted to slip over the foam 184. The cover has end flaps 189, which pass through a slot 181 defined between the upper pan 186 and the lower pan 187. The end flaps are stiched to Velco 182 fasteners to secure the cover to the headrest foam. A back cover member 198, which is attached to the back pan after the cushions are installed, encloses the rear side of the back seat and covers the connection of the upholstery edges and conceals from vandals.

Referring to FIGS. 4A and 5, a deep groove is cut in the foam 129 and the wire 130 extends along the groove and is encased within a cover, which is sewn to the upholstery. This pulls the upholstery material into the groove to define the horizontal groove which divides the pillow into upper and lower sections. Three of the pull tabs, 139A-139c, connect the wire 130 to the back pan 187. The wires 126 and 127 define the recessed center portion 150 of the pillow.

As shown best in FIG. 5, the pull tabs 139, which provide the tufted look, are sewn to the inside surface of the upholstery as at 140, and have "T" shaped portions 158 extending through holes 159 formed through the foam layer 129. The pull tabs are held in place by discs 145'. The ends of the shank portions 158 extend through apertures in the back panel as shown in FIG. 5.

A welt cord 145, which extends around the peripheral edge of the back seat pillow, draws in the middle section of the pillow edge, and draws the upholstery material tight around the front edges of the pillow.

Referring again to FIG. 1, the seating assembly 40 essentially is comprised of the basic frame and seat cushion assembly, the right and left back assemblies, and the pedestal mount assembly. As has been described, due to the novel seat back mounting arrangement, the seat backs are easily installed and removed. Also, the pedestal support assembly is adapted to be removably fastened to the bottom of the basic frame, and is thus also readily removed and installed. This modular construction is particularly advantageous in that it results in reduced shipping volume. This permits the seating assemblies to be shipped in higher density and affords more compact storage in warehouses.

Figure 6:
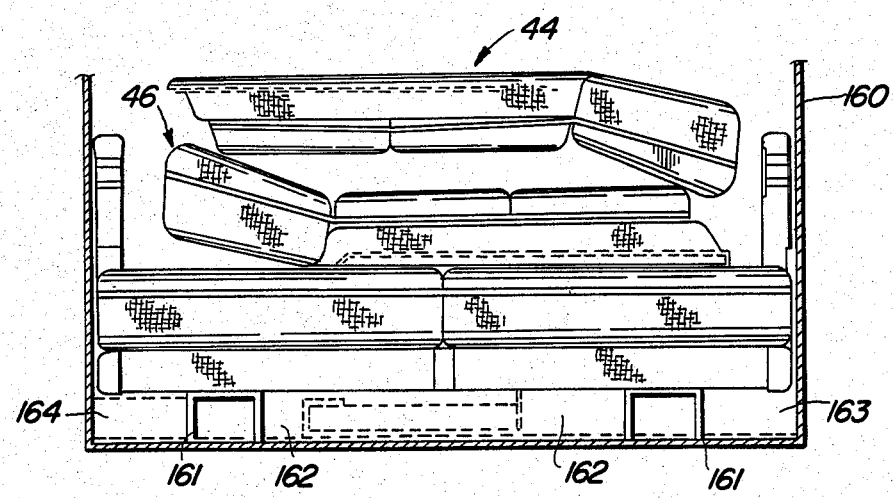
FIGS. 6 and 7 illustrate the seating assembly disassembled and packed in a shipping carton.
Figure 7:
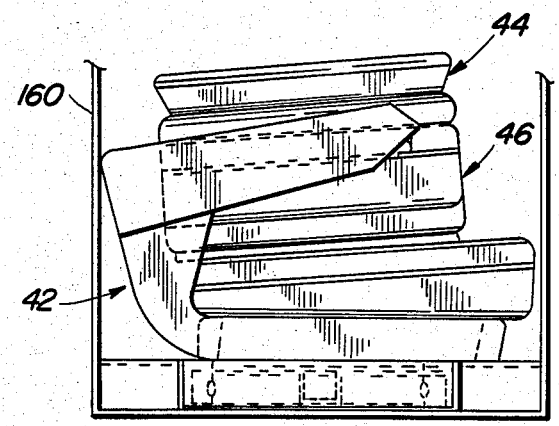

FIGS. 6 and 7 show the modular seating assembly disassembled and packed in a carton 160 suitable for shipping or storing the seating unit. The basic frame and seat cushion assembly 42 is supported on suitable spacer blocks 161 within the carton which support the frame assembly spaced above the bottom of the carton, defining a storage chamber 162 for the wedge pedestal, as well as additional compartments 163,164 for hardware, and other loose parts needed to assemble the seating units. One of the back assemblies 46 is positioned on the seat cushion and the other back assembly 44 is inverted and placed on back assembly 46. It is evident from FIGS. 6 and 7 that the entire seating assembly can be packed in a single self-contained carton affording compact storage as well as increased shipping densities.

We claim:

1. In a vehicle seating assembly the combination comprising: a support frame supporting at least one seat; a seat back assembly mountable to said support frame; and mounting means for mounting said seat back assembly on said support frame for reclinable movement relative to a normal generally upright position, said mounting means including a fixed pivot means secured to said support frame and an adjustable pivot means carried by said support frame, said back assembly having first and second pivot receptors, said fixed pivot means having a first pivot pin which is received by said first pivot receptor, said adjustable pivot means having a second pivot pin aligned coaxially with said first pivot pin and said adjustable pivot means being constructed and arranged for movement horizontally along said support frame toward and away from said fixed pivot means between a first position in which said second pivot pin is received by said second pivot receptor and a second position in which said second pivot pin is disengaged from said second pivot receptor, and locking means for releasably securing said adjustable pivot means to said support frame to maintain said adjustable pivot means at said first position, thereby maintaining said first and second pivot pins of said fixed and adjustable pivot means in receiving engagement with said first and second pivot receptors to mount said seat back on said support frame for pivotal movement relative thereto, and said locking means being releasable to permit said adjustable pivot means to be moved to said second position permitting removal of said seat back from said support frame.

2. A vehicle seating assembly according to claim 1 wherein said first pivot pin is fixedly mounted on said support frame, and wherein said adjustable pivot means comprises a bracket adapted for sliding movement along said support frame and carrying said second pivot pin therewith.

3. A vehicle seating assembly according to claim 1 wherein said frame supports a pair of seats and a pair of seat back assemblies are mountable to said support frame, and including one of said mounting means for each back assembly.

4. A vehicle seating assembly according to claim 3 further comprising an armrest assembly for each of said back assemblies, each armrest assembly being cantilever mounted on said support frame.

5. A vehicle seating assembly according to claim 4 wherein the armrest assemblies are identical in construction and the back assemblies are identical in construction.

6. A vehicle seating assembly according to claim 1 which further comprises support means including a pedestal mount for supporting the frame above the floor of a vehicle and for attaching the seating assembly to the floor of the vehicle.

7. A vehicle seating assembly according to claim 6 wherein said support means includes means for removably attaching the pedestal mount to the underside of said support frame near the center thereof.

8. In a vehicle seating assembly the combination comprising: a support frame supporting at least one seat; a seat back assembly mountable to said support frame, and mounting means for mounting said seat back assembly on said support frame for reclinable movement relative to a normal generally upright position, said mounting means including a fixed pivot means seacured to said support frame and an adjustable pivot means carried by said support frame, said back assembly having first and second pivot receptors, said fixed pivot means having a first pivot pin which is received by said first pivot receptor, said adjustable pivot means having a second pivot pin aligned coaxially with said first pivot pin, and said adjustable pivot means being constructed and arranged for movement horizontally along said support frame toward and away from said fixed pivot pin means between a first position in which said second pivot pin is received by said second pivot receptor and a second position in which said second pivot pin is disengaged from said second pivot receptor, and locking means for releasably securing said adjustable pivot means to said support frame to maintain said adjustable pivot means at said first position, thereby maintaining said first and second pivot pins of said fixed and adjustable pivot means in receiving engagement with said first and second pivot receptors to mount said seat back on said support frame for pivotal movement relative thereto, and said locking means being releasable to permit said adjustable pivot means to be moved to said second position permitting removal of said seat back from said support frame, and said seat back having a back seat cushion portion which includes a layer of a soft foam material having first and second surfaces; a layer of upholstery material coerving said foam material at its first surface and defining the outer surface of the back seat cushion portion, said foam material having at least one groove formed therein on its first surface; and shaping means drawing into said groove the upholstery material which extends adjacent to said groove to create a pillowed configuration for the upholstered outer surface of said back seat cushion.

* * * * *